US008060287B2

(12) United States Patent
Headlee et al.

(10) Patent No.: US 8,060,287 B2
(45) Date of Patent: Nov. 15, 2011

(54) SERVICE BRAKE CONTROL SYSTEM FOR OPTIMIZED REGENERATIVE BRAKING OF MEDIUM OR HEAVY TRUCKS

(75) Inventors: William R. Headlee, Fort Wayne, IN (US); Tony L. Rogness, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 602 days.

(21) Appl. No.: 12/185,407

(22) Filed: Nov. 14, 2008

(65) Prior Publication Data

US 2010/0125398 A1 May 20, 2010

(51) Int. Cl.
*B60T 7/00* (2006.01)
*B60T 8/00* (2006.01)
(52) U.S. Cl. .............. 701/70; 701/78; 701/81; 303/152
(58) Field of Classification Search .................. 701/70, 701/71, 76, 77, 78, 81; 303/3, 152; 188/17, 188/18 R, 21; 180/65.1, 65.31
See application file for complete search history.

(56) References Cited

U.S. PATENT DOCUMENTS

| | | |
|---|---|---|
| 3,621,929 A | 11/1971 | Oberthur et al. |
| 4,305,254 A | 12/1981 | Kawakatsu et al. |
| 5,253,929 A | 10/1993 | Ohori |
| 5,378,053 A | 1/1995 | Patient et al. |
| 5,433,512 A | 7/1995 | Aoki et al. |
| 5,632,534 A | 5/1997 | Knechtges |
| 5,853,229 A * | 12/1998 | Willmann et al. ............. 303/3 |
| 5,895,100 A | 4/1999 | Ito et al. |
| 6,070,953 A | 6/2000 | Miyago |
| 6,076,899 A | 6/2000 | Isella |
| 6,244,674 B1 | 6/2001 | Kuno et al. |
| 6,407,465 B1 | 6/2002 | Peltz |

(Continued)

FOREIGN PATENT DOCUMENTS

DE 102007011257 A1 9/2008

(Continued)

OTHER PUBLICATIONS

PCT Search Report from corresponding application, application No. PCT/US2009/064184, mailing date of Feb. 24, 2010.

(Continued)

*Primary Examiner* — Kevin Hurley
*Assistant Examiner* — Marc Scharich
(74) *Attorney, Agent, or Firm* — Jeffrey P. Calfa; Mark C. Bach

(57) ABSTRACT

Braking control for a hybrid vehicle provides both service and regenerative mode braking for the driven wheels. A hybrid drive system is coupled to the driven wheels to provide traction power and which is capable of operating in a regenerative braking mode. The service brakes are provided by pneumatically actuated service brakes coupled to the driven wheels. Braking is initiated conventionally using an operator controlled brake actuator. A pressure regulator is placed in a pneumatic brake actuation line coupled from the operator controlled brake actuator to the pneumatically actuated service brakes for the driven wheels. The pressure regulator initially closes during braking, preventing operation of the service brakes up to the limit of the ability of the hybrid drive system to absorb torque for regenerative braking. When the torque limit for the hybrid drive system is reached, the regulator opens the actuation line progressively allowing the service brakes to supplement the hybrid drive system. During loss of traction events regenerative braking is discontinued to avoid interference with operation of anti-lock braking of the vehicle's service brakes.

13 Claims, 2 Drawing Sheets

U.S. PATENT DOCUMENTS

| | | |
|---|---|---|
| 6,454,364 B1 | 9/2002 | Niwa et al. |
| 6,598,945 B2 | 7/2003 | Shimada et al. |
| 6,739,677 B2 | 5/2004 | Tazoe et al. |
| 2006/0102394 A1 | 5/2006 | Oliver |
| 2010/0244547 A1* | 9/2010 | Gilles et al. ........................ 303/3 |

FOREIGN PATENT DOCUMENTS

| | | |
|---|---|---|
| EP | 1092584 A1 | 4/2001 |
| EP | 1491386 A1 | 12/2004 |
| JP | 06107137 A2 | 4/1994 |
| JP | 10115335 A2 | 5/1998 |

OTHER PUBLICATIONS

International Preliminary Report on Patentability dated May 26, 2011 for corresponding application No. PCT/US09/64184.

* cited by examiner

SERVICE BRAKE CONTROL SYSTEM FOR OPTIMIZED REGENERATIVE BRAKING OF MEDIUM OR HEAVY TRUCKS

BACKGROUND OF THE INVENTION

1. Technical Field

The invention relates to brake system control of a motor vehicle, and more particularly to control of braking where a vehicle includes regenerative braking capability and conventional service brakes.

2. Description of the Problem

Various types of hybrid and electric vehicles obtain higher operating efficiencies and extend operating range by using regenerative braking. During regenerative braking a vehicle's kinetic energy is captured converted to a form amenable to storage. For example electrical energy may be stored in capacitors or subjected to conversion to potential chemical energy and stored in batteries or capacitors, or the energy may be stored mechanically by compressing a fluid. Later, the stored energy can be used to propel the vehicle. In the case of electrical power it can be applied as electricity to a traction motor, and on a hydraulic hybrid vehicle the working fluid can be applied to a pump under pressure. Regenerative braking may operate to supplement or replace operation of the conventional service brakes, in a fashion similar to an engine brake or retarder in the drive line on a conventional vehicle. The torque absorbed for regeneration supplements the braking torque requested by the driver by use of the brake pedal. Absent compensating brake pedal resistance, this results in the vehicle stopping faster for a given brake pedal input and biases the braking force to the drive axle(s).

In a full hybrid or electric vehicle, the vehicle's electric traction motor doubles as the electrical generator which can be coupled to be driven by the wheels. On a hydraulic hybrid vehicle a pump may be coupled to the driveline. Typically only some of the wheels are driven, and thus capable of being coupled to the electric traction motor/generator or hydraulic pump when it is operating in its generating/storage mode. Thus, on either type of vehicle, a portion of the braking torque will come from the service brakes mounted with non-driven wheels, though braking force is biased toward the drive axles as they receive both service brake torque and regeneration torque while the non-drive axle(s) receive only service brake torque. Consideration may be given the issue of anti-lock braking systems (ABS) which distribute braking force to maintain braking stability.

U.S. Pat. No. 6,454,365 describes a braking force control system for a vehicle incorporating hydraulic service brakes and regenerative braking for the vehicle's drive wheels. The '365 patent provides a braking controller which generates a target braking force for front and rear wheels of the vehicle. Initially the controller applies regenerative braking in attempting to meet the target braking force levels. If regenerative braking proves insufficient to meet braking target levels, friction service brake operation is added to any wheels not supplying the target level of braking torque.

SUMMARY OF THE INVENTION

The invention provides a braking system for a motor vehicle. A plurality of wheels are coupled to a motor which provides traction power for propelling the vehicle and regenerative braking for slowing or stopping of the motor vehicle. Pneumatically actuated service brakes are further coupled to the drive wheels to provide slowing or stopping of the motor vehicle. An operator controlled brake actuator connects air from a compressed air source to a pneumatic brake actuation line to pneumatically actuate the service brakes for the driven wheels. A pressure regulator is disposed in the pneumatic brake actuation line. A brake controller is provided which is responsive to operation of the operator controlled brake actuator for closing the pressure regulator in the pneumatic brake actuation line up until the torque limit of the motor operating in the regenerative braking mode. An anti-lock braking system controller may be further provided responsive to indications of limited traction for overriding closure of the pressure regulator in the pneumatic brake actuation line to open the pressure regulator and providing for cessation of regenerative operation of the hybrid drive system. The control functions are implemented by incorporating pressure transducers in the driven wheel, service-brake, pneumatic actuation line. These are located both upstream and downstream from the pressure regulator for the line. The upstream transducer signal indicates occurrences of actuation of the brake actuator. The downstream transducer confirms operation of the pressure regulator.

Additional effects, features and advantages will be apparent in the written description that follows.

BRIEF DESCRIPTION OF THE DRAWINGS

The preferred mode of use, further objects and advantages of the present disclosure, will best be understood by reference to the following detailed description of an illustrative embodiment when read in conjunction with the accompanying drawings, wherein.

DETAILED DESCRIPTION OF THE INVENTION

Figure 1:
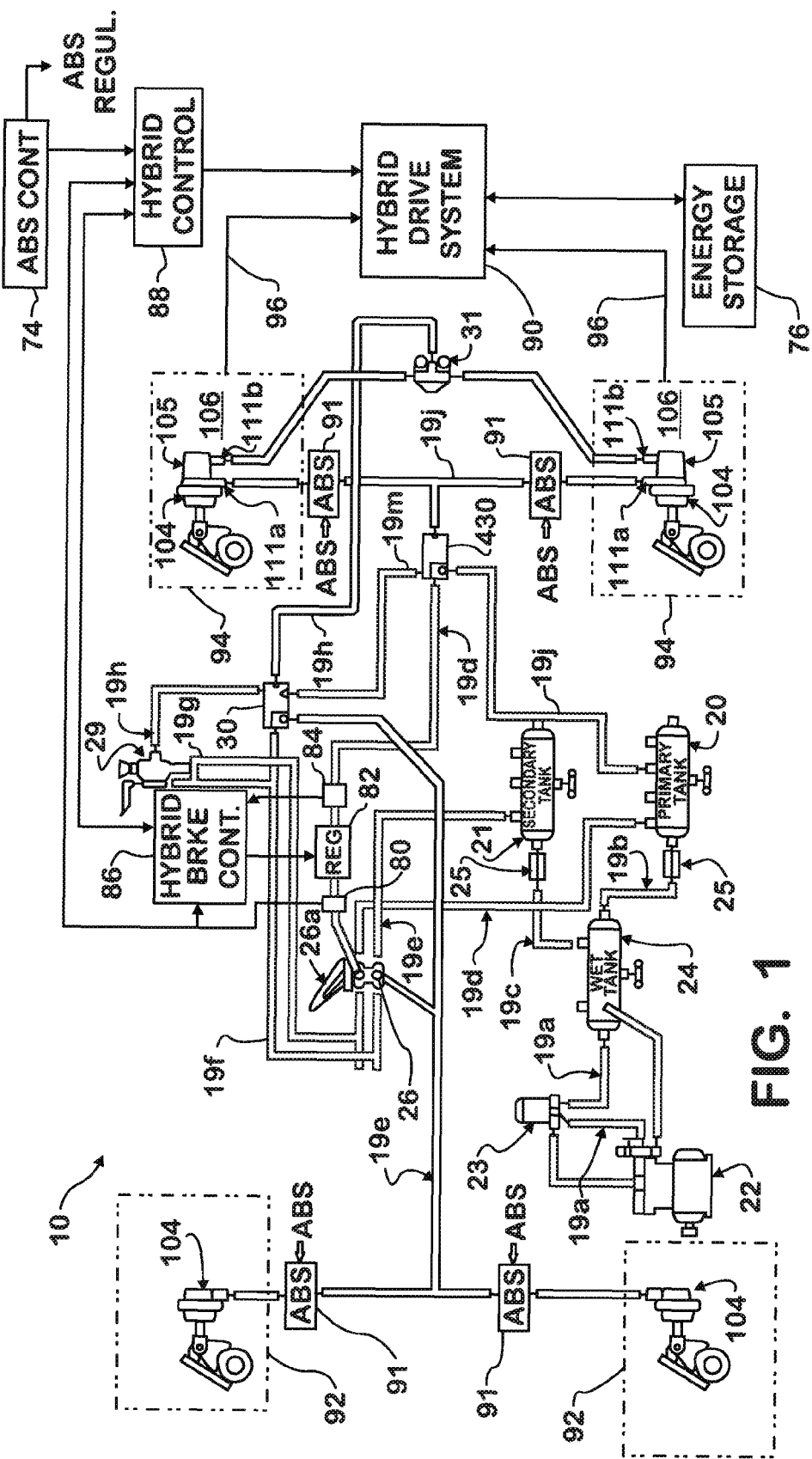
FIG. 1 is a brake circuit schematic illustrating the modifications used to implement one embodiment of the invention.

Referring now to the drawings and in particular to FIG. 1, a brake system 10 for a medium or heavy duty vehicle is illustrated. Brake system 10 is illustrated as configured for a vehicle having a front axle and a rear axle (the axles are not shown), but may be applied to other configurations, such as vehicles with lift axles and other combinations of axles having driven and non-driven wheels. Associated with the front and rear axles are individual, wheel mounted, pneumatically actuated service brakes 104. The rear wheels 94 have brake assemblies 106 which include a park or spring brake chamber 105 in addition to the service brake 104 while the front wheels 92 do not include a park brake. In addition, the rear wheels 94 are connected by a vehicle drive train 96 to a hybrid drive system, such as an electric traction motor or the preferred hydraulic drive system 90, which can operate regeneratively to supply braking torque. The rear wheel 94 brake assemblies 106 provide service braking and park braking. In the configuration illustrated the rear wheels 94 are driven and the front wheels 92 are non-driven.

The functioning of the parking brake is discussed here for the sake of completeness of description of the pneumatic brake actuation system. Control over the distinct parking and service brake functions of the rear wheel brake assemblies 106 are accomplished by having separate air ports 111a and 111b for the service brake chambers 104 and the spring brake chambers 105, respectively. The service braking air port 111a allows air to be directed to the service brake chamber 104 to move brake pads (not shown) to stop the rear wheels. The park braking port 111b allows air to be directed to the spring brake chambers 105 to act counter internal springs which normally urge application of brake pads. When the parking brake is disengaged, compressed air holds the park brakes off and free movement of the rear wheels 94 is allowed. Air is delivered to a quick release valve (QRV) 31 along an air line 19*h* from a push pull double check valve (PPDC) 29 and a spring brake modulator valve 30 for delivery to the park brake chambers 105. Air is also supplied to the spring brake modulator valve 30 from relay valve 430 along air line 19*m* from the primary tank 20 and along air line 19*f* from the foot actuated double valve 26 from the secondary tank 21. The parking brake system makes use of the redundant compressed air sources (primary and secondary compressed air tanks 20, 21) to avoid unintended engagement of the parking brake system should one compressed air source fail. Air lines 19*f* and 19*g* supply air from the primary and secondary tanks 20, 21 through the double valve 26 to a push pull double check (PPDC) valve 29.

The pneumatic components in the brake system 10 are supplied with compressed air from an air compressor 22. Air compressor 22 supplies air via air line 19*a* though an air dryer 23 to a wet tank 24. The wet tank 24 acts as a supply reservoir for both a primary air tank 20 and a secondary air tank 21, which in turn supply the service and parking brake systems. Air lines 19*b* and 19*c*, respectively, deliver air from the wet tank 24 to the primary air tank 20 and the secondary tank 21. Check valves 25 are incorporated into air lines 19*b* and 19*c* allowing air to flow out from the wet tank 24 but not back into the wet tank.

Primary air tank 20 and secondary air tank 21 are the direct sources of supply of pressurized air for brake system 10. The primary air tank 20 supplies air for service braking for the rear wheels 94 and the secondary air tank 21 supplies air for service braking for the front wheels 92. Since independent sources of air are used for the service brakes for the rear and front wheels 94, 92, the service brake system is considered to be redundant. Air is routed from primary air tank 20 via air line 19*d* through a foot actuated double valve 26 upon depression of foot pedal 26*a*. On anti-lock braking system (ABS) equipped vehicles quick release valves 31 (QRVs) are used only for rear parking brake functions. ABS modulators 91 perform the QRV functions for the service brakes and are included in the air lines 19*j* and 19*e* which supply air to the brake assemblies 104. For the rear brakes an air line 19*j* from the primary tank 20 to the rear wheel 94 brake assemblies 104 includes a relay valve 430 which is actuated by air from the foot actuated double valve 26 delivered along air line 19*d* as a pneumatic signal for applying air to the rear wheel service brakes 104. Air from secondary air tank 21 is coupled to the service brakes 104 for the front wheels 92 for service braking via air line 19*e* through the double valve 26 upon depression of foot pedal 26*a*. The operation of the ABS modulators 91 is well known in the art. The ABS modulators 91 operate to modulate air pressure delivered to the service brakes 104 to distribute braking torque to the wheel best able to absorb it.

In the brake system 10 as illustrated the rear wheels 94 are driven and the front wheels 92 are non-driven. One source of traction power for the rear wheels 94 is a hybrid drive system, preferably a hydraulic system 90, which is mechanically connected to the rear wheels by drive line 96. During braking hydraulic drive system 90 operates as a pump turned by the wheels 94. In an electric traction motor system a motor operates as a generator. Thus service braking is supplemented by regenerative braking which is applied to the rear wheels 94. During normal operation of the brake system 10, rear wheel 94 braking torque should be supplied by the hybrid (hydraulic) drive system 90, and not the service brakes 104, in order to recapture as potential energy as much of the vehicle's kinetic energy as possible.

During emergency braking, particularly where ABS operation comes into play, factors affecting vehicle control and the need for stopping the vehicle arise which may mitigate against the use of regenerative braking. Brake system 10 is modified to implement control over service brake operation and regenerative braking to better meet these potentially conflicting engineering requirements. Air line 19*d*, connecting the foot actuated double valve 26 to the relay valve 430 (i.e., the air line transmitting a pneumatic signal from the foot-controlled valve to the relay valve for controlling application of pressure from the primary tank 20 to the rear service brakes 104 through the relay valve) is modified to include two pressure transducers, a primary transducer 80 and a feedback transducer 84, with an intervening pressure regulator 82. The pressure transducers 80, 84 are located in air line 19*d* with the primary transducer 80 upstream from, and the feedback transducer 84 downstream from, the pressure regulator 82. The pressure transducers 80, 84 report pressure readings to a hybrid brake controller 86, from which the pressure difference across the pressure regulator 82 can be determined. Additionally, pressure transducer 80 reports pressure readings in air line 19*d* to a hybrid controller 88. A control signal from the hybrid brake controller 86 is applied to modulator 82.

The hybrid drive system 90 is under the control of the hybrid controller 88, which can set system 90 into a regeneration mode for operation as a pump or generator, depending upon the type of drive system, e.g. hydraulic, electric. A hydraulic drive system operates as a pump to increase pressure on a hydraulic fluid delivered through an energy storage device 76 embodied in an accumulator. The details of this arrangement are outside the scope of the present invention.

Hybrid controller 88 communicates by one of various data network systems with the hybrid brake controller 86 and an ABS controller 74. The hybrid controller 88 can report the amount of torque being absorbed by the drive system 90 during regenerative braking to the hybrid brake controller 86. The hybrid brake controller 86 compares this with the degree of braking demanded as indicated by a pressure transducer 80. In normal operation the hybrid brake controller 86 utilizes braking demand pressure as detected transducer 80 to demand regenerative braking from the drive system 90 up to the torque limit of its regenerative braking capacity. The front service brakes 104 are unaffected and operate normally. Once the torque limit of the drive system 90 is reached, the hybrid brake controller adjusts the pressure regulator 82 to allow actuation of the service brakes 104 for the rear wheels 94 to supplement the drive system 90 braking.

During ABS events the regenerative braking functionality of the drive system 90 is normally cancelled and the hybrid brake controller 86 is instructed to allow normal service brake operation along air line 19*d* by opening pressure regulator 82. ABS controller 74 is connected to the hybrid controller 88 and the hybrid brake controller 86 to allow communication of the appropriate indication. ABS controller 74 also controls the modulation of ABS modulators 91 associated with the service brakes 104 for each wheel of the vehicle equipped with service brakes. ABS control over braking is provided over the service brakes 104 only. The object is that ABS operation is unaffected by the modifications to the brake system introduced by the invention. During an ABS event regulator 82 is opened. To confirm that the pneumatic braking system is operating conventionally, that is, as though no regenerative braking were available, the feedback pressure transducer in air line 19*d*, transducer 84, should provide feedback indication to the hybrid brake controller 86 that pressure in air line 19d following regulator 82 closely matches the pressure measured by transducer 80 ahead of regulator 82.

Figure 2:
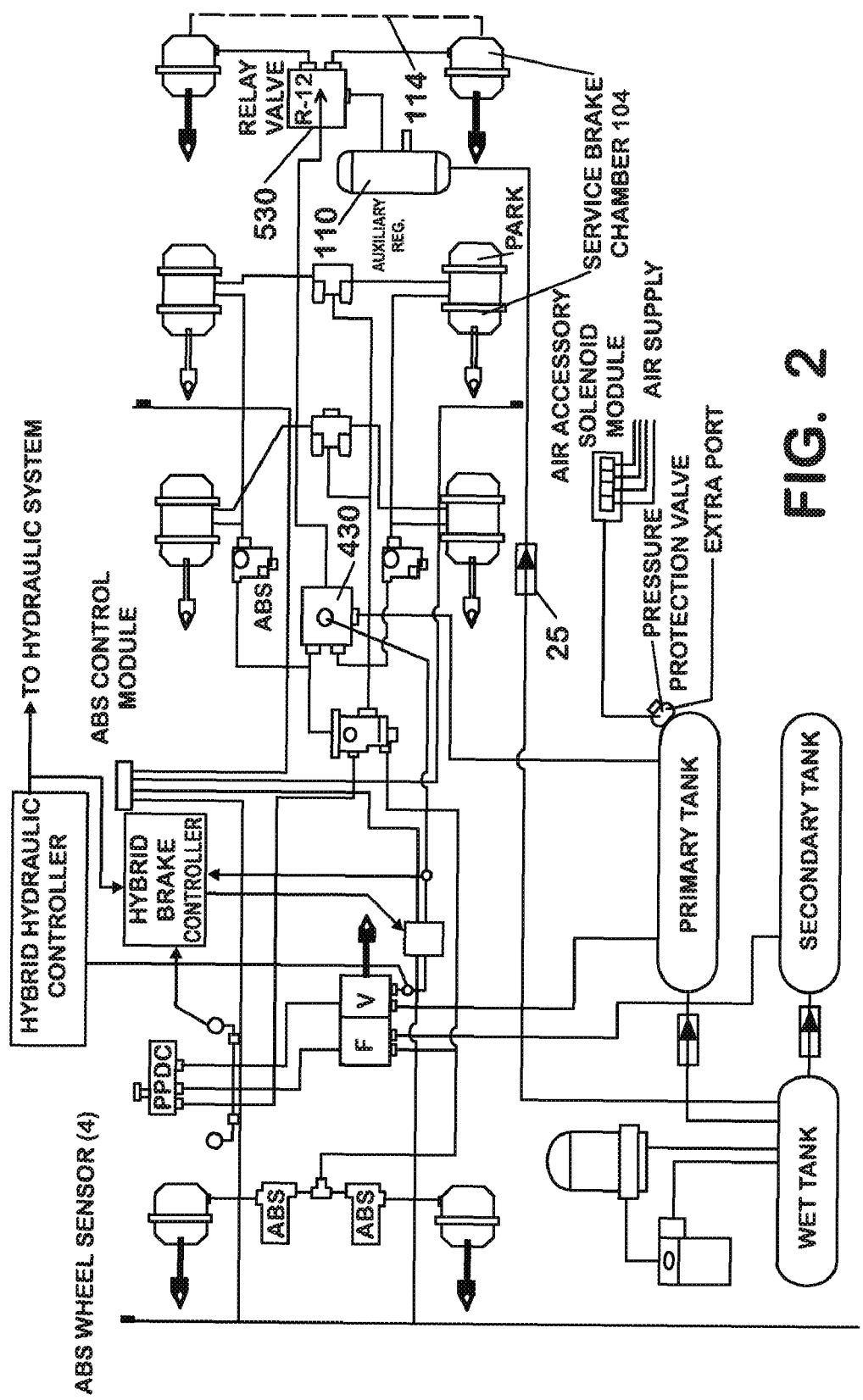
FIG. 2 is a brake circuit schematic illustrating an alternative embodiment of the invention.

FIG. 2 illustrates an embodiment of the invention applied to a 6×4 truck with a lift axle 114. Service brakes 104 associated with wheels for the lift axle 114 have no associated park brake chambers. In addition, the lift axle is a non-driven axle, meaning no regenerative braking is produced from it. The service brakes 104 are actuated by a signal from an ABS control module 74 to relay valve 530. A local auxiliary air tank 110 supplies the air to the relay valve 530 for operation of the service brakes 104 for lift axle wheels. ABS modulation of the brakes of the lift axle is not directly provided. During ABS events the brakes of the lift axle 114 may be lightly braked or not braked at all.

The electronically controlled air pressure regulator 82 (located between the primary and feedback pressure transducers 80, 84) controls pressure in the primary air pressure signal line when the vehicle operator actuates the foot pedal 26a. When the vehicle operator is not requesting service brake application, this regulator is fully open (normally open). This allows for normal service brake function should there be a loss of power or control signal to the regulator. The hybrid brake controller determines how much air pressure is needed at the primary service brake relay valve to properly supplement the hybrid hydraulic regenerative braking torque up to the vehicle operator requested level. It sends a control signal to the electrically controlled air pressure regulator and monitors the signal from the second pressure transducer to ensure proper signal line air pressure to the primary service brake relay valve. The hybrid brake controller 86 control signal is disabled (the electronically controlled air pressure regulator allows full signal line pressure to pass unimpeded) during ABS active and other priority braking events. Under these conditions, full service braking capability is maintained and uninterrupted. The controller is also disabled when the ABS system is deactivated. The invention allows for increased regenerative braking efficiency because of the reduced or eliminated application of the service brakes on the axle(s) providing torque to the hybrid hydraulic drive system. The increase in regeneration efficiency will allow for greater availability of hydraulic launch assist from the hybrid hydraulic drive system, thus decreasing fuel consumption. This would be of significant benefit in vocations with frequent start and stop driving conditions.

While the invention is described with reference to only a few of its possible forms, it is not thus limited but is susceptible to various changes and modifications without departing from the spirit and scope of the invention.

What is claimed is:

1. A braking system for a motor vehicle comprising:
a plurality of driven wheels;
a drive system coupled to the driven wheels for providing traction power for the driven wheels and providing a regenerative braking mode for the driven wheels during slowing or stopping of the motor vehicle;
pneumatically actuated service brakes coupled to the driven wheels;
an operator controlled brake actuator;
a pneumatic brake actuation line coupled from the operator controlled brake actuator to the pneumatically actuated service brakes for the driven wheels;
a pressure regulator in the pneumatic brake actuation line; and
a brake controller responsive to operation of the operator controlled brake actuator for closing the pressure regulator in the pneumatic brake actuation line until a torque limit of the drive system is reached when operating in the regenerative braking mode and after the torque limit of the drive system is reached progressively opening the pressure regulator to meet additional braking demand.

2. A braking system in accord with claim 1, further comprising:
a primary pressure transducer in the pneumatic brake actuation line upstream from the pressure regulator and indicating braking demand from operator use of the operator controlled brake actuator;
a feedback pressure transducer in the pneumatic brake actuation line downstream from the pressure regulator; and
the primary and feedback pressure transducers being connected to provide pressure measurement signals to the brake controller.

3. A braking system in accord with claim 2, further comprising:
a plurality of non-driven wheels; and
pneumatically actuated service brakes for the plurality of non-driven wheels.

4. A braking system in accord with claim 3, further comprising:
at least some of the non-driven wheels being mounted to a lift axle.

5. A braking system in accord with claim 3, further comprising:
the motor vehicle being a hybrid vehicle.

6. A braking system in accord with claim 3, further comprising:
the pressure regulator having a default open position.

7. A control system for a hybrid vehicle comprising:
service and regenerative brakes for a plurality of wheels, the regenerative brakes having an upper torque limit capacity;
a pneumatic actuation system for the service brakes including an operator controlled brake actuator and pneumatic actuation lines for the service brakes; and
a pressure regulator in a pneumatic brake actuation line coupled from the operator controlled brake actuator to the pneumatically actuated service brakes for the wheels having regenerative brakes, the pressure regulator initially being closed responsive to an operator initiated request for braking and remaining closed until the upper torque limit capacity of the regenerative brakes is reached and after the upper torque limit is reached the pressure regulator progressively opening to allow actuation of the service brakes to supplement the regenerative brakes.

8. A control system for a hybrid vehicle in accord with claim 7, further comprising:
an anti-lock braking system controller for detecting loss of traction events, the anti-lock braking system controller providing signals indicative of the loss of traction: and
a brake controller being responsive to loss of traction signals for disabling the regenerative brakes and providing for opening the pressure regulator.

9. A control system for a hybrid vehicle in accord with claim 8, further comprising:
the brake controller providing control for the pressure regulator; and
pressure transducers upstream from and downstream from the pressure regulator in the pneumatic brake actuation line, the pressure transducers being connected to the brake controller for the pressure regulator.

10. A control system for a hybrid vehicle in accord with claim 9, wherein the regenerative brakes are a hydraulic motor which operates in a pump mode.

11. A control system for a hybrid vehicle in accord with claim 10, further comprising:
service brakes for wheels not having regenerative brakes.

12. A control system for a hybrid vehicle in accord with claim 11, further comprising:
a plurality of pressure modulators coupled into pneumatic actuation lines for service brakes; and
the brake controller for controlling the modulators during skidding events.

13. A control system for a hybrid vehicle in accord with claim 12, further comprising:
the pressure regulator having a default open position.

* * * * *